(12) United States Patent
Krueger et al.

(10) Patent No.: US 7,949,492 B2
(45) Date of Patent: May 24, 2011

(54) MEASURING MECHANICAL PROPULSIVE POWER BY ENERGY CONVERSION

(75) Inventors: Paul S. Krueger, Plano, TX (US);
Christian Naaktgeboren, Dallas, TX (US)

(73) Assignee: Southern Methodist University, Dallas, TX (US)

( * ) Notice: Subject to any disclaimer, the term of this patent is extended or adjusted under 35 U.S.C. 154(b) by 1001 days.

(21) Appl. No.: 11/765,034

(22) Filed: Jun. 19, 2007

(65) Prior Publication Data

US 2007/0299629 A1 Dec. 27, 2007

Related U.S. Application Data

(60) Provisional application No. 60/805,630, filed on Jun. 23, 2006.

(51) Int. Cl.
*G01L 5/00* (2006.01)

(52) U.S. Cl. .......... 702/182; 702/33; 702/105; 702/127; 702/183; 73/862.381; 410/1; 410/4; 410/5; 410/33; 290/44; 290/54; 290/55

(58) Field of Classification Search ............ 702/33, 702/105, 127, 182, 183; 73/861.381; 410/1, 410/4, 5, 12.5, 33; 290/44, 54, 55
See application file for complete search history.

(56) References Cited

U.S. PATENT DOCUMENTS

| 7,741,727 | B2 * | 6/2010 | Fein et al. ................. 290/43 |
| 2003/0111844 | A1 * | 6/2003 | McDavid, Jr. ............. 290/55 |

OTHER PUBLICATIONS

Glauert, H., "*Division L Airplane Propellers*", vol. IV, Aerodynamic Theory, W.F. Durand, ed., pp. 169-360 plus index, 1934.

Bull, G., et al., "*A Method for Flight-Test Determination of Propulsive Efficiency and Drag*", J. Aircraft, vol. 22, No. 3, pp. 200-207, Mar. 1985.

Cheng, Jian-Yu, et al., "*Note on the Calculation of Propeller Efficiency Using Elongated Body Theory*", J. exp. Biol., vol. 192, pp. 169-177, Mar. 23, 1994.

D'Aout, Kristiaan, et al., "*Kinematics and Efficiency of Steady Swimming in Adult Axolotls (Ambystoma mexicanum)*", The Journal of Experimental Biology, vol. 200, pp. 1863-1871, Apr. 18, 1997.

Anderson, J. M., et al., "*Oscillating foils of high propulsive efficiency*," J. Fluid Mech., vol. 360, pp. 41-72, Nov. 17, 1997.

(Continued)

*Primary Examiner* — Sujoy K Kundu
(74) *Attorney, Agent, or Firm* — Baker Botts L.L.P.

(57) ABSTRACT

Measuring mechanical propulsive power includes establishing a first power and a second power. The first power is associated with a first rate of energy conversion by a device in a fluid, where the device is in the wake of a self-propelled conveyance moving with respect to the fluid. The average distance between the device and self-propelled conveyance may remain substantially unchanged. The second power is associated with a second rate of energy conversion by the device in the fluid without the self-propelled conveyance, where the other physical factors are substantially similar to that associated with the first power. The difference between the first power and the second power is calculated. The mechanical propulsive power for the self-propelled conveyance is determined using mappings, where a mapping associates the difference with the mechanical propulsive power.

20 Claims, 1 Drawing Sheet

OTHER PUBLICATIONS

Bartol, Ian K., et al., "*Swimming mechanics and behavior of the shallow-water brief squid Lolliguncula brevis*", The Journal of Experimental Biology, vol. 204, pp. 3655-3682, Aug. 6, 2001.

Nauen, Jennifer C., et al., "*Quantification of the wake of rainbow trout (Oncorhynchus mykiss) using three-dimensional stereoscopic digital particle image velocimetry*", The Journal of Experimental Biology, vol. 205, pp. 3271-3279, Aug. 7, 2002.

Schultz, William W., et al., "*Power Requirements of Swimming: Do New Methods Resolve Old Questions?*", Integr. Comp. Biol., vol. 42, pp. 1018-1025, 2002.

Anderson, Erik J., et al., "*Jet flow in steadily swimming adult squid*", The Journal of Experimental Biology, vol. 208, pp. 1125-1146, Jan. 24, 2005.

Schouveiler, L., et al., "*Performance of flapping foil propulsion*", Journal of Fluids and Structures, vol. 20, pp. 949-959, May 5, 2005.

* cited by examiner

MEASURING MECHANICAL PROPULSIVE POWER BY ENERGY CONVERSION

RELATED APPLICATION

This application claims benefit under 35 U.S.C. §119(e) of U.S. Provisional Application Ser. No. 60/805,630, entitled "MEASURING MECHANICAL PROPULSIVE POWER BY ENERGY CONVERSION," filed Jun. 23, 2006, by Paul S. Krueger, et al.

GOVERNMENT FUNDING

The U.S. Government may have certain rights in this invention as provided for by the terms of Contract Nos. CTS-0347958 and IOB-0446229 awarded by the National Science Foundation.

TECHNICAL FIELD

This invention relates generally to the field of measuring mechanical properties and more specifically to measuring mechanical propulsive power by energy conversion.

BACKGROUND

Evaluating the performance of mechanisms for propelling a vehicle through a fluid involves determining propulsive efficiency. Propulsive efficiency $\eta$ may be defined as the ratio of the rate of work $\dot{W}$ done by the propulsion system over mechanical power used for propulsion, or mechanical propulsive power P. That is, propulsive efficiency may be defined as $\eta = \dot{W}/P$.

One known technique of measuring propulsive efficiency involves placing sensors on a propulsor (such as a propeller) of the vehicle to measure the rate of work and mechanical propulsive power. Another known technique infers propulsive efficiency from the performance of the vehicle, such as the acceleration after a sudden power increase in the propulsion system. Another known technique estimates propulsive efficiency from the kinematics of an object traveling in the wake of the vehicle. Another known technique infers propulsive efficiency from the muscle power or metabolic rate associated with the propulsion.

These known techniques, however, are not satisfactory in certain situations. For example, known techniques may require complex equipment for measuring propeller propulsion. It is generally desirable to have satisfactory techniques in these certain situations.

SUMMARY OF THE DISCLOSURE

In accordance with the present invention, disadvantages and problems associated with previous techniques for measuring mechanical propulsive power may be reduced or eliminated.

According to one embodiment of the present invention, a system and method for measuring mechanical propulsive power involved establishing a first power and a second power. The first power is associated with a first rate of energy conversion by a device in a fluid, where the device is in the wake of a self-propelled conveyance moving with respect to the fluid. The average distance between the device and self-propelled conveyance may remain substantially unchanged. The second power is associated with a second rate of energy conversion by the device in the fluid without the self-propelled conveyance, where the other physical factors are substantially similar to that associated with the first power. The difference between the first power and the second power is calculated. The mechanical propulsive power for the self-propelled conveyance is determined using mappings, where a mapping associates the difference with the mechanical propulsive power.

Certain embodiments of the invention may provide one or more technical advantages. A technical advantage of one embodiment may be a measuring system that measures the mechanical propulsive power of a vehicle moving through a fluid. The measuring system determines the power output of or input to (output/input) a device in the wake of the vehicle. The difference between the power output/input of the device when the vehicle is present and when vehicle is absent may be used to measure the mechanical propulsive power.

Another technical advantage of one embodiment may be that the measuring system may measure any suitable property to determine the difference between the power output/input. As an example, the measuring system may measure the towing force used to tow the device or the holding force used to hold the device in place. As another example, the measuring system may measure the pressure distribution or temperature at the device.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Figure 1:
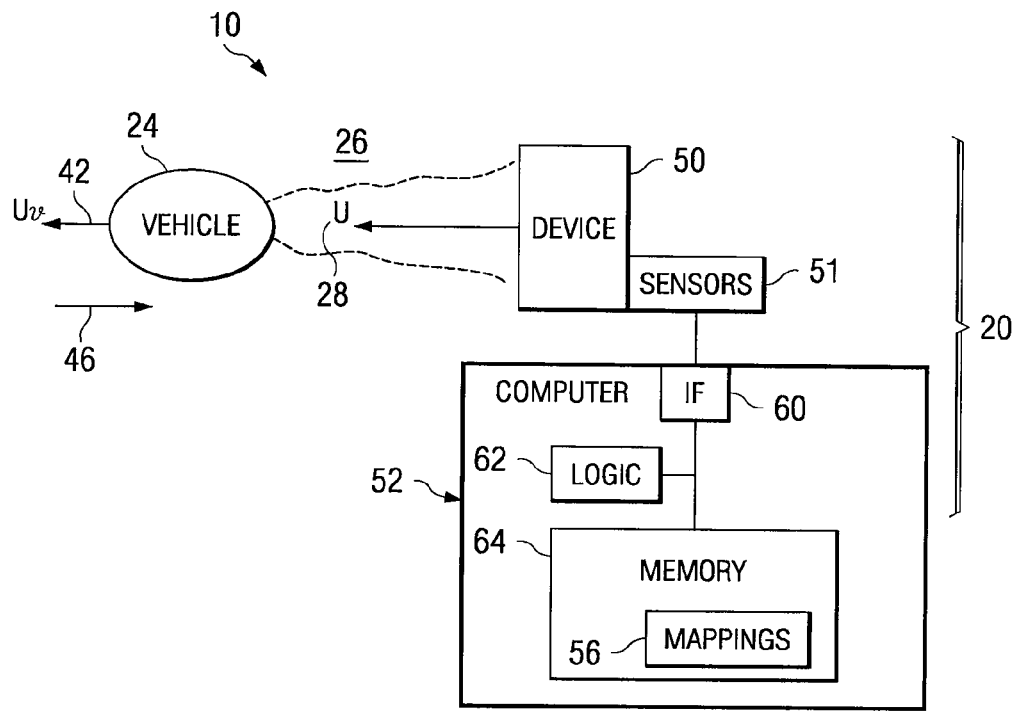
FIG. 1 is a block diagram of one embodiment of an environment that includes a measurement system for measuring mechanical propulsive power by energy conversion.
Figure 2:
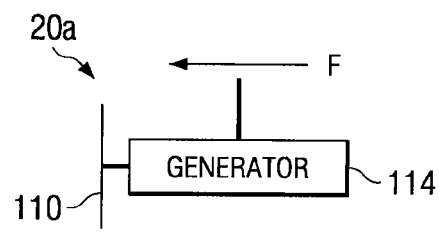
FIG. 2 is a block diagram of an example of a measurement system that may be used in the environment of FIG. 1.
Figure 3:
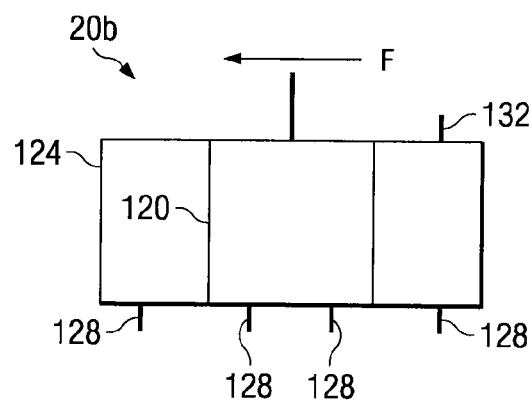
FIG. 3 is a block diagram of another example of a measurement system that may be used in the environment of FIG. 1.

Embodiments of the present invention and its advantages are best understood by referring to FIGS. 1 through 3 of the drawings, like numerals being used for like and corresponding parts of the various drawings.

FIG. 1 is a block diagram of an environment 10 that includes one embodiment of a measurement system 20 for measuring mechanical propulsive power by energy conversion. According to the embodiment, measurement system 20 includes a device 50, one or more sensors 51, and a computer 52. In the embodiment, vehicle 24 propels itself through a fluid 26, creating a wake 28. As vehicle 24 moves in a direction 42, vehicle 24 accelerates fluid 26 in a direction 46 opposite to direction 42, imparting kinetic energy to fluid 26 in wake 28. Thus, wake 28 includes kinetic energy related to disturbance imposed by movement of vehicle 24 through fluid 26.

The mechanical propulsive power affects the total rate at which vehicle 24 adds kinetic energy to wake 28, so the kinetic energy may be measured to determine the mechanical propulsive power. Device 50 in vehicle wake 28, where the average distance between device 50 and vehicle 24 remains relatively unchanged, converts kinetic energy into another form of energy. Accordingly, the power output of or input to (output/input) device 50 can be used to determine the kinetic energy, which can in turn be used to measure the mechanical propulsive power. In one embodiment, the difference between the power output/input of device 50 when vehicle 24 is present and when vehicle 24 is absent (but the other physical factors are substantially similar to those when vehicle 24 is present) may be determined to measure the mechanical propulsive power.

In one embodiment, vehicle 24 represents a self-propelled conveyance operable to move through fluid 26 at a speed UV relative to that of fluid 26. A self-propelled conveyance may be an aerial or aquatic mechanical or biological system. Examples of such conveyances include submarines, airplanes, fishes, and birds. Fluid 26 represents any suitable gas and/or liquid, such as air or water.

In one embodiment, measurement system 20 measures mechanical propulsive power using power differences. Mechanical propulsive power is distinguished from total power used for propulsion, as the total power includes thermal losses in addition to the mechanical power. According to one embodiment, a measurement system 20 generates mappings that associate values of power differences with values of mechanical propulsive power. The same or a different measurement system 20 then measures a power difference in a particular case and uses the mappings to determine a mechanical propulsive power associated with the power difference.

In the embodiment, device 50 is towed behind vehicle 24 at a speed U, which may be substantially equivalent to the time-averaged value of $U_v$. Device 50 converts fluid kinetic energy into another form of energy. The kinetic energy may be converted into any suitable form of energy, such as electrical, mechanical, or thermal. Measurements are taken with and without vehicle 24 to determine power differences.

Sensors 51 at device 50 may make the measurements. The output of device 50 may be measured if the conversion generates a measurable output. The input to device 50 may be measured if the input is measurable and/or the conversion is substantially dissipative.

Computer 52 generates mappings 56 from the measurements received from sensors 51. A difference value is mapped to the mechanical propulsive power value that yields the difference value. Thus, a mapping 56 maps a difference value to mechanical propulsive power value indicated by the difference value. Mappings 56 may be used to determine a mechanical propulsive power associated with the power difference.

According to one embodiment, computer 52 represents any suitable device operable to execute instructions and manipulate data to perform operations, for example, a personal computer, work station, network computer, wireless telephone, personal digital assistant, one or more microprocessors within these or other devices, or any other suitable processing device.

Computer 52 includes an interface 60, logic 62, and a memory 64. Interface 60 receives input, sends output, and/or performs suitable processing of the input and/or output. Logic 62 represents hardware, software, and/or other logic operable to perform the operations of measurement system 20. Certain logic may comprise a processor that executes instructions and manipulates data to perform the operations. Memory 64 stores and facilitates retrieval of information, and may comprise Random Access Memory (RAM), Read Only Memory (ROM), a magnetic drive, a disk drive, a Compact Disk (CD) drive, a Digital Video Disk (DVD) drive, removable media storage, and/or any other suitable data storage medium. In the illustrated embodiment, memory 64 stores mappings 56.

According to the illustrated embodiment, vehicle 24 moves through a quiescent fluid 26. According to another embodiment, vehicle 24 may be in a fluid 26 moving at a speed U opposite to the direction of propulsive force. For example, vehicle 24 may be in a wind and/or water tunnel. In this embodiment, measurement system 20 may be fixed in place rather than towed.

Modifications, additions, or omissions may be made to system 20 without departing from the scope of the invention. The components of system 20 may be integrated or separated according to particular needs. Moreover, the operations of system 20 may be performed by more, fewer, or other modules. Additionally, operations of system 20 may be performed using any suitable logic. As used in this document, "each" refers to each member of a set or each member of a subset of a set.

Modifications, additions, or omissions may be made to the method described with reference to system 20 without departing from the scope of the invention. The method may include more, fewer, or other steps. Additionally, steps may be performed in any suitable order without departing from the scope of the invention.

FIG. 2 is a block diagram of an example of a measurement system 20*a* that may be used in environment 10 of FIG. 1. Measurement system 20*a* includes a windmill 110 coupled to an electric generator 114. Windmill 110 represents any suitable airscrew designed to absorb mechanical power from fluid 26. Generator 114 represents any suitable generator operable to convert mechanical power from windmill 110 to electrical power.

According to the embodiment, measurement system 20*a* is towed by a towing force or held in place by a holding force. The power output of generator 114 is affected by the rate at which kinetic energy is added to the vehicle wake 28. Accordingly, the difference in electrical output with and without vehicle 24 present can be used to measure the mechanical propulsive power.

Modifications, additions, or omissions may be made to system 20*a* without departing from the scope of the invention. The components of system 20*a* may be integrated or separated according to particular needs. Moreover, the operations of system 20*a* may be performed by more, fewer, or other modules. Additionally, operations of system 20*a* may be performed using any suitable logic.

FIG. 3 is a block diagram of another example of a measurement system 20*b* that may be used in environment 10 of FIG. 1. Measurement system 20*b* includes a porous medium 120 disposed within a shroud 124. Porous medium 120 converts the kinetic energy in wake 28 into internal/sensible energy in fluid 26 through viscous dissipation. Porous medium 120 may comprise any suitable material, for example, screens, wire meshes, perforated plates, reticulated foam, and/or fibrous material.

Shroud 124 substantially contains porous medium 120 and reduces the dissolution of porous medium 120 in fluid 26. Shroud 124 may comprise an assembly of any suitable material, for example, glass, PLEXIGLASS, or metal. In one embodiment, porous medium 120 may be used without shroud 124.

Measurement system 20*b* may also include one or more pressure sensors 128 and/or one or more temperature sensors 132. Pressure sensors 128 measure the pressure distribution along device 50, and temperature sensors 132 measure the temperature at the exit of porous medium 120.

Measurement system 20b may be substantially passive. An input power FU may be used to tow measurement system 20 through the fluid at a velocity U, where F represents the towing force. Porous medium 120 converts the kinetic energy in vehicle wake 28 into internal/sensible energy, which affects the towing force and the pressure distribution along device 50. Accordingly, the difference in the towing force or the pressure distribution with and without vehicle 24 present can be used to measure mechanical propulsive power.

According to one embodiment, the difference in internal/sensible energy can be used to measure mechanical propulsive power. In one embodiment, the internal/sensible energy may be inferred from the temperature at the exit of porous medium 120 and the heat capacity of fluid 26.

Modifications, additions, or omissions may be made to system 20b without departing from the scope of the invention. The components of system 20b may be integrated or separated according to particular needs. Moreover, the operations of system 20b may be performed by more, fewer, or other modules. Additionally, operations of system 20b may be performed using any suitable logic.

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure, as defined by the following claims.

What is claimed is:

1. A method for measuring mechanical propulsive power, comprising:
   establishing, by one or more processors, a plurality of powers by:
     establishing a first power associated with a first rate of energy conversion by a device in a fluid, the device in a wake of a self-propelled conveyance moving with respect to the fluid; and
     establishing a second power associated with a second rate of energy conversion by the device in the fluid without the self-propelled conveyance;
   calculating, by the one or more processors, a difference between the first power and the second power; and
   determining, by the one or more processors, a mechanical propulsive power for the self-propelled conveyance in accordance with a plurality of mappings, a mapping of the plurality of mappings associating the difference with the mechanical propulsive power.

2. The method of claim 1, wherein:
   the first power comprises a first power output of the device; and
   the second power comprises a second power output of the device.

3. The method of claim 1, wherein:
   the first power comprises a first power input to the device; and
   the second power comprises a second power input to the device.

4. The method of claim 1, wherein establishing a power of the plurality of powers comprises:
   determining a towing force; and
   establishing the power from the towing force.

5. The method of claim 1, wherein establishing a power of the plurality of powers comprises:
   determining a holding force; and
   establishing the power from the holding force.

6. The method of claim 1, wherein establishing a power of the plurality of powers comprises:
   measuring a pressure distribution; and
   establishing the power from the pressure distribution.

7. The method of claim 1, wherein establishing a power of the plurality of powers comprises:
   measuring a temperature; and
   establishing the power from the temperature.

8. The method of claim 1, the device comprising:
   a windmill operable to absorb mechanical power from the fluid; and
   a generator operable to convert mechanical power from the windmill to electrical power.

9. The method of claim 1, the device comprising:
   a porous medium operable to convert kinetic energy in the wake into sensible energy through viscous dissipation.

10. A measurement system for measuring mechanical propulsive power, comprising:
    a device operable to convert energy; and
    one or more processors coupled to the device and operable to:
      establish a plurality of powers by:
        establishing a first power associated with a first rate of energy conversion by the device in a fluid, the device in a wake of a self-propelled conveyance moving with respect to the fluid; and
        establishing a second power associated with a second rate of energy conversion by the device in the fluid without the self-propelled conveyance;
      calculate a difference between the first power and the second power; and
      determine a mechanical propulsive power for the self-propelled conveyance in accordance with a plurality of mappings, a mapping of the plurality of mappings associating the difference with the mechanical propulsive power.

11. The measurement system of claim 10, wherein:
    the first power comprises a first power output of the device; and
    the second power comprises a second power output of the device.

12. The measurement system of claim 10, wherein:
    the first power comprises a first power input to the device; and
    the second power comprises a second power input to the device.

13. The measurement system of claim 10, the one or more processors further operable to establish a power of the plurality of powers by:
    determining a towing force; and
    establishing the power from the towing force.

14. The measurement system of claim 10, the one or more processors further operable to establish a power of the plurality of powers by:
    determining a holding force; and
    establishing the power from the holding force.

15. The measurement system of claim 10:
    further comprising at least one sensor operable to:
      measure a pressure distribution; and
    the one or more processors further operable to establish a power of the plurality of powers by:
      establishing the power from the pressure distribution.

16. The measurement system of claim 10:
further comprising at least one sensor operable to:
  measure a temperature; and
the one or more processors further operable to establish a power of the plurality of powers by:
  establishing the power from the temperature.

17. The measurement system of claim 10, the device comprising:
  a windmill operable to absorb mechanical power from the fluid; and
  a generator operable to convert mechanical power from the windmill to electrical power.

18. The measurement system of claim 10, the device comprising:
  a porous medium operable to convert kinetic energy in the wake into sensible energy through viscous dissipation.

19. The measurement system of claim 10, further comprising:
  a memory operable to store the plurality of mappings.

20. A system for measuring mechanical propulsive power, comprising:
  means for establishing a plurality of powers by:
    establishing a first power associated with a first rate of energy conversion by a device in a fluid, the device in a wake of a self-propelled conveyance moving with respect to the fluid; and
    establishing a second power associated with a second rate of energy conversion by the device in the fluid without the self-propelled conveyance;
  means for calculating a difference between the first power and the second power; and
  means for determining a mechanical propulsive power for the self-propelled conveyance in accordance with a plurality of mappings, a mapping of the plurality of mappings associating the difference with the mechanical propulsive power.

* * * * *